Nov. 14, 1961   H. N. HARRIS   3,008,237
RETICLE
Filed Sept. 28, 1959
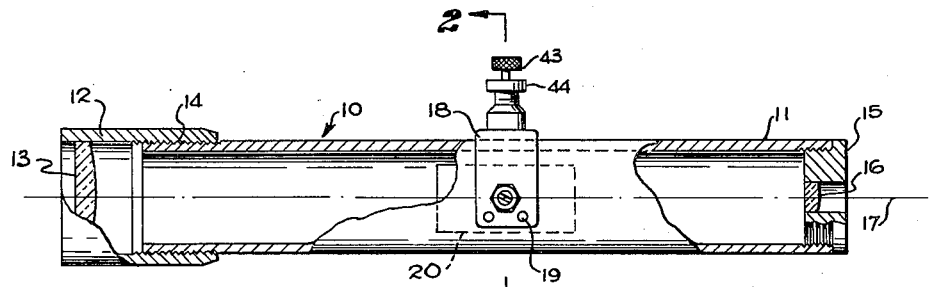
Harlan N. Harris
INVENTOR
BY Angus & Mon
ATTORNEYS

United States Patent Office 3,008,237
Patented Nov. 14, 1961

3,008,237
RETICLE
Harlan N. Harris, 1850 N. Ave. 51, Los Angeles, Calif.
Filed Sept. 28, 1959, Ser. No. 842,867
20 Claims. (Cl. 33—50)

This invention relates to telescopic sights.

Telescopic sights are commonly used in connection with devices which are to be pointed at an object. Examples of such devices are guns, and surveying instruments. In these sights, it is common practice to provide a reticle in the form of crossed hair lines of uniform thickness. The cross provides a reference for indicating the center of the field of the sight, and thus a reference for relative alignment of the device, such as the gun bore, or the indicating elements of a surveying instrument.

There are numerous disadvantages involved in the use of cross-hairs, particularly in gun sights. One disadvantage arises because of the variability in their contrast with the field being observed. For example, when hunting at long range, the background is often sufficiently bright that even thin cross-hairs can be effectively seen in the sight. Then, the thinner the line, the better. However, this arrangement is inappropriate for hunting when the background is dark, such as at close range in dark forests, or in the open at reduced levels of illumination, such as at dusk, for then thin hair lines may not be visible at all in the telescope system. A much wider line is needed. Thus, the cross-hairs which were satisfactory at one time are essentially useless at another. This problem has remained unsolved until the instant invention, because conventional sights have not provided means for adjusting the width of the reference lines independently of the telescope power.

It is an object of this invention to provide means for varying the size of the reference lines independently of the power of the sight.

In telescopes of adjustable power, if the power is changed, the thickness of the reticle lines will themselves change. However, the thickness of the lines is then a function of the magnification in the telescope system, and cannot be adjusted independently thereof. Thus, when higher powers are used, the lines thicken at the very time it may be preferred to have them thinner.

This invention is carried out in combination with a telescopic system and comprises a reticle placed therein so that it may be viewed as though superimposed on the field being viewed. A preferred but optional feature of the invention resides in the provision of one reference element of the reticle in the form of a rotatable post. The object is non-circular around its axis of rotation, and its preferred embodiment is a wedge-shape which tapers down toward a point near the optical axis of the sight.

According to still another preferred but optional feature of the invention, another reference element is provided in said reticle which comprises an elongated strip that extends across the sight, said strip being twisted so that it shows a minimum dimension (herein called a "node") at a central location, and an increasing lateral dimension as it extends away from the node. In the preferred embodiment of this invention, this reference element comprises a flat strip with a 180° twist in it.

According to still another preferred but optional feature of the invention, the said strip may be mounted so its twist is adjustable. This permits adjustment of the lateral dimension of the strip as viewed in the sight.

The above and other features of this invention will be fully understood from the following detailed description and the accompanying drawings, in which:

FIG. 1 is a side view partly in cutaway cross-section of a telescopic gun sight incorporating the invention;

FIG. 2 is a cross-section taken at line 2—2 of FIG. 1;

FIG. 3 is a side view of a portion of the device of FIG. 1 taken at line 3—3 of FIG. 2;

FIG. 4 is a side view of another portion of the device of FIG. 1;

FIG. 5 is a bottom view taken at line 5—5 of FIG. 4; and

FIGS. 6 and 7 are fragmentary views, partly in cutaway cross-section, showing optional constructions for portions of the invention.

The telescopic sight 10 is shown in FIG. 1 and is a type commonly used with a hunting rifle. The sight includes a barrel 11 having a pair of open ends, at one end of which is an eyepiece 12 having a lens 13 therein, the position of which is adjustable by turning the eyepiece along threads 14. At the other end of the barrel there is an insert 15 which carries a field lens 16. The optical axis 17 of the sight is disposed along the center of the barrel.

To the outside of the barrel there is fixed a mount 18 which may be attached by screws 19 or any other suitable means. Inside the barrel there is a reticle 20 according to the invention (see FIG. 2).

The reticle 20 may include supporting structure which is laterally movable relative to the optical axis, so that the reference point may be shifted to allow for windage and range. This supporting structure includes an elongated reticle tube 21 having three flats 22, 23, 24 in its outside surface. Against flat 22 there bears the head 25 of a windage adjustment screw 26. Screw 26 is threaded through the wall of the barrel, and through mount 18, and has an end projecting beyond the mount. This end has a slot 27 for receiving a screwdriver or other means for turning the screw. A lock nut 28 is threaded onto screw 26 outside the tube, and may be tightened down against the mount to hold the screw in an adjusted position. Between flat 23 and the inner wall of tube 21 there is a leaf spring 29 which is preferably disposed about 135° from the centers of flats 22 and 24.

The surface of flat 24 has a countersunk passage 30 extending through the reticle tube. A post member 31 includes a flange 32 whose lower surface abuts flat 24. In the upper surface there is a groove 33. Below the lower surface there is a cylindrical and tapered portion 34 which fits in the countersunk passage. Beneath portion 34 there is a post 35 integral with member 31.

The post has an axis of rotation 36 which is normal to the optical axis of the sight. As can be seen from FIGS. 4 and 5, the preferred embodiment of the post is that of a wedge, whereby the wedge has a pair of different lateral dimensions 37, 38, the wedge preferably, but not necessarily, tapering to a point.

An adjustment member 39 has a flange 40 with a tongue 41 in its lower surface. Tongue 41 fits in groove 33 in torque-transmitting engagement. Adjustment member 39 includes a shaft 42 which has a knurled head 43 on its end away from the flange. The lower surface of flange 40 bears against the upper surface of flange 32.

An elevation adjustment screw 44 is threadedly engaged in the wall of the barrel and in the mount. Its lower end bears on the upper surface of flange 40. A lock nut 45 is threaded to screw 44 to hold the screw in an adjusted position. Screw 44 has a knurled flange 46. The supporting structure for the reticle comprises the reticle tube, spring 29, and the windage and elevation adjustments. The reticle itself comprises the rotatable post, together with a horizontal reference next to be described.

A horizontal reference for the reticle comprises an elongated non-circular strip 47 which extends along a lateral axis 48 which is normal to the axis of rotation of the post, although these two axes need not intersect. In the embodiment illustrated, the strip is a piece of shim stock approximately ¾" in length, 0.001" thick, and 0.010"

in width. It has a 180° twist and is mounted by soldering or any other suitable means to the reticle tube. It will be understood that in the event the reticle were not desired to be adjustable for such parameters as windage and elevation, the post and the strip could have been directly attached to the barrel instead of to the said supporting structure.

Although the wedge shown in the figures is the preferred embodiment for the post, because this can provide an adjustment varying between a sharp point and a broad flat rectangular surface in side elevation seen looking down the barrel of the sight, the principal requirement is that in cross-section taken normal to the axis of rotation, the shape be non-circular. Then the lateral dimension, as seen in elevation viewed along the optical axis, can be adjusted by turning the post. The same considerations apply to the cross-section of the strip.

As to the strip, it is well known that when strips or like shapes are twisted, a nodular structure results in which thin sections (called "nodes" herein) appear between tapering nodules. This shape results regardless of the number of degrees of twist. In this invention, the simplest and most satisfactory arrangement is to twist the strip 180°. However, it will be understood that similar results can be obtained by twisting the strip more than zero degrees, and less than 180°, or by twisting the strip more than 180° by using adjoining nodes as the central portion to be disposed along the central axis of the tube. Therefore, while a twist between zero and 180°, and particularly a 180° twist, is the presently preferred embodiment, this is not a restriction on the invention.

In FIG. 6, there is shown a means whereby the thickness adjustment of the post may be made independent of the adjustment of the supporting means. In FIG. 6, barrel 49 is shown with a mount 50 thereon, and an elevation adjustment screw 51 threaded through the barrel of the mount and bearing against a flat 52 on reticle tube 53. A post member 54 passes through the adjustment screw with clearance on all sides, and is threadedly engaged to and passes through reticle tube 53. Member 54 has a head 55 above the elevation adjustment screw. A lock nut 56 is threaded to the outside of screw 51 to hold the screw in an adjusted position.

The post member includes a shaft 57 which has clearance between it and the inside of the elevation adjustment screw, and has at its lower end a post 58 which is preferably a wedge, like post 35, but which may also be any of the other embodiments heretofore disclosed. Turning shaft 57 changes both the thickness and the elevation. If supporting structure such as the reticle tube is not used, post member 54 could be threaded directly into the barrel.

In FIG. 7, there is illustrated a means whereby the amount of twist of the horizontal strip is rendered adjustable. In this figure, there is shown a barrel 60 within which the reticle tube 61 is disposed. A strip holder 62 passes through a hole 63 in the reticle tube, and is freely slidable and rotatable therein. Strip 64 is fixed to the inner end of the strip holder.

The strip holder includes a flange 65 between the barrel and the reticle tube, and is biased toward the barrel by a waffle-spring 66. A shaft 67, which forms part of the strip holder, passes with side clearance through a hole 68 in the barrel, and includes a head 69 which is disposed outside the barrel. Rotation of the head will govern the amount of twist of the strip. A similar device is to be placed at the other end of the strip so that the strip can be twisted and adjusted so that its node is disposed at the center. The elevation and windage adjustments, if any, may be placed adjacent to and separate from this particular adjustment.

It is believed that the operation of this device will be evident from the drawings and the above description. An observer looking down the barrel from left to right will see the view in FIG. 2, wherein the point of the post and the narrowest portion of the strip approach each other at the central axis. Incidentally, they could be made to visually coincide by axially spacing them so that they would not strike each other.

In the embodiment of FIGS. 1 and 2, the thickness of the vertical post may be adjusted simply by turning adjustment member 39 which rotates the post to bring into view more or less of the lateral dimension thereof. Therefore, the thickness of this may be varied between the smallest dimension as shown in FIG. 2, and the widest dimension which is shown in FIG. 4. If a shape other than a wedge is used, similarly the thickness of the post as viewed can be varied as a function of turning the adjustment member.

The windage and elevation adjustments, which are provided by the supporting structure and the adjustment screws, are adjusted in the usual manner.

The device of FIG. 6 is utilized by adjusting the windage and screw 51, if these are provided. Then shaft 57 will be turned to adjust the post width in the field. It will be seen that the difference between the structures shown in FIGS. 2 and 6 is that in FIG. 2, the thickness of the post is adjusted independently of the windage. Thus, windage can be set in and then the thickness can be separately adjusted. In some embodiments, it may be desired to have the thickness of the post be a function of the elevation, and that is the purpose of the embodiment of FIG. 6. The adjustment screw may be used as a coarse adjustment for elevation, and the final setting may be made by turning shaft 57, which simultaneously adjusts both elevation and post width.

The embodiment of FIG. 7 permits the strip to be more or less twisted so that if desired, a straight line could be provided by untwisting the strip. Also, this allows the strip to be twisted anywhere between that position as a minimum and the position illustrated in FIG. 2 as a suggested maximum, although even more twist could be provided if desired.

This invention is not to be limited by the embodiments shown in the drawings and described in the description, which are given by way of example and not of limitation, but only in accordance with the scope of the appended claims.

I claim:

1. A reticle for a telescopic sight for providing a pattern in a plane normal to the optical axis of the sight, comprising: an elongated strip of material having a central axis disposed normal to and intersecting with the optical axis, said strip having a cross section on both sides of said optical axis which, in planes normal to the central axis, has a major dimension and a smaller minor dimension, whereby when the strip is twisted, it forms as viewed along the optical axis a node adjoined by nodules on opposite sides thereof which narrow toward said node, said strip being twisted and placed so that the node is at a reference location in said sight; and a rotatable post having an axis of rotation intersecting and normal to the optical axis of the sight, said post having a cross-section normal to its axis of rotation which has a major dimension and a smaller minor dimension, the axis of rotation and the node lying in a plane parallel to the optical axis, whereby the post and the strip, when viewed along the axis, provide an optical reference, and whereby rotation of the post varies the width of the post as viewed along the optical axis.

2. A reticle according to claim 1 in which the strip is twisted no more than 180°.

3. A reticle according to claim 1 in which the strip when twisted is flat, and is twisted no more than 180°.

4. A reticle according to claim 1 in which the posts is tapered with its narrower end nearer the optical axis.

5. A reticle according to claim 1 in which the post is wedge-shaped, having a sharp edge, said sharp edge being the closest part of the wedge to the optical axis.

6. A reticle according to claim 1 in which the said cross-section of the reticle is rectangular.

7. A telescopic sight comprising: a barrel; a field lens; an eyepiece lens, said lenses being mounted to said barrel along an optical axis therethrough to form a telescope; an elongated strip of material having a central axis disposed normally to and intersecting with the optical axis, said strip having a cross section on both sides of said optical axis which, in planes normal to the central axis, has a major dimension and a smaller minor dimension, whereby when the strip is twisted, it forms as viewed along the optical axis, a node adjoining by two nodules on opposite sides thereof which narrow toward said node, said strip being twisted and placed so that the node is at a reference location in said sight; and a rotatable post having an axis of rotation intersecting and normal to the optical axis of the sight, said post having a cross-section normal to its axis of rotation which has a major dimension and a smaller minor dimension, the axis of rotation and the node lying in a plane parallel to the optical axis, whereby the post and the strip, when viewed along the axis, provide an optical reference, and whereby rotation of the post varies the width of the post as viewed along the optical axis.

8. A telescopic sight according to claim 7 in which the post is wedge-shaped, having a sharp edge, said sharp edge being the closest part of the wedge to the optical axis.

9. A telescopic sight according to claim 7 in which the ends of the strip are rotatably mounted in the barrel whereby the angle of twist can be adjusted by turning the ends.

10. A telescopic sight having an optical axis comprising: a barrel on the optical axis, a reticle tube disposed within the barrel, the outer dimensions of said reticle tube being less than the inside dimensions of said barrel where the reticle tube is situated, a spring disposed between the barrel and the tube biasing the tube toward the barrel in a first direction, and windage and elevation adjustment screws threaded into and passing through the barrel and bearing against the tube at angles angularly spaced from said first direction; an elongated strip of material having a central axis disposed normally to and intersecting with the optical axis, said strip having a cross section on both sides of said optical axis which, in planes normal to the central axis, has a major dimension and a smaller minor dimension, whereby when the strip is twisted, it forms as viewed along the optical axis, a node adjoined by two sections on opposite sides of the node which narrow toward said node, said strip having its ends attached in the reticle tube, and extending across it, also being twisted and placed so that the node is at a reference location in said sight; and a rotatable post having an axis of rotation intersecting and normal to the optical axis of the sight, said post having a cross-section normal to its axis of rotation which has a major dimension and a smaller minor dimension, the axis of rotation and the node lying in a plane parallel to the optical axis, whereby the post and the strip when viewed along the optical axis, provide an optical reference, and whereby rotation of the post varies the width of the post as viewed along the optical axis, and means exterior of the barrel for turning said post.

11. A reticle according to claim 10 in which the post is tapered with its narrower end nearer the optical axis.

12. A reticle according to claim 10 in which the post is wedge-shaped, having a sharp edge, said sharp edge being the closest part of the wedge to the optical axis.

13. A reticle according to claim 10 in which the said cross-section of the reticle is rectangular.

14. In a telescopic sight having a barrel and an optical axis along the barrel, a reference line comprising a solid, imperforate and completely opaque post projecting into said barrel, said post having an axis of rotation intersecting and normal to the optical axis of the sight and having a cross-section normal to its axis of rotation, which has a major dimension and a smaller minor dimension.

15. Apparatus according to claim 14 in which the post is tapered, becoming narrower toward said optical axis.

16. Apparatus according to claim 14 in which the post is wedge-shaped has a sharp free edge.

17. Apparatus according to claim 14 in which the post has a free end which terminates at the optical axis, whereby said free end comprises a reference point for sighting purposes.

18. Apparatus according to claim 17 in which the post is tapered, becoming narrower toward said optical axis.

19. Apparatus according to claim 17 in which the post is wedge-shaped, its free edge being sharp.

20. In a telescopic sight having a barrel and an optical axis along said barrel, a reference line comprising an elongated strip of material having a central axis disposed normally to and intersecting with the optical axis, said strip having a cross-section on both sides of said optical axis which, in planes normal to the central axis, has a major dimension and a smaller dimension, whereby when the strip is twisted, it forms, as viewed along the optical axis of the sight, a node adjoined by two nodules on opposite sides thereof which narrow toward said node, the ends of the strip being rotatably mounted to the barrel whereby the angle of twist of the material is adjustable.

References Cited in the file of this patent

UNITED STATES PATENTS

| | | |
|---|---|---|
| 1,048,876 | Raedel | Dec. 31, 1912 |
| 1,380,150 | Keeran | May 31, 1921 |
| 2,250,179 | Brown | July 22, 1941 |
| 2,769,239 | Oswald | Nov. 6, 1956 |
| 2,800,718 | Benford | July 30, 1957 |